Patented Nov. 14, 1950

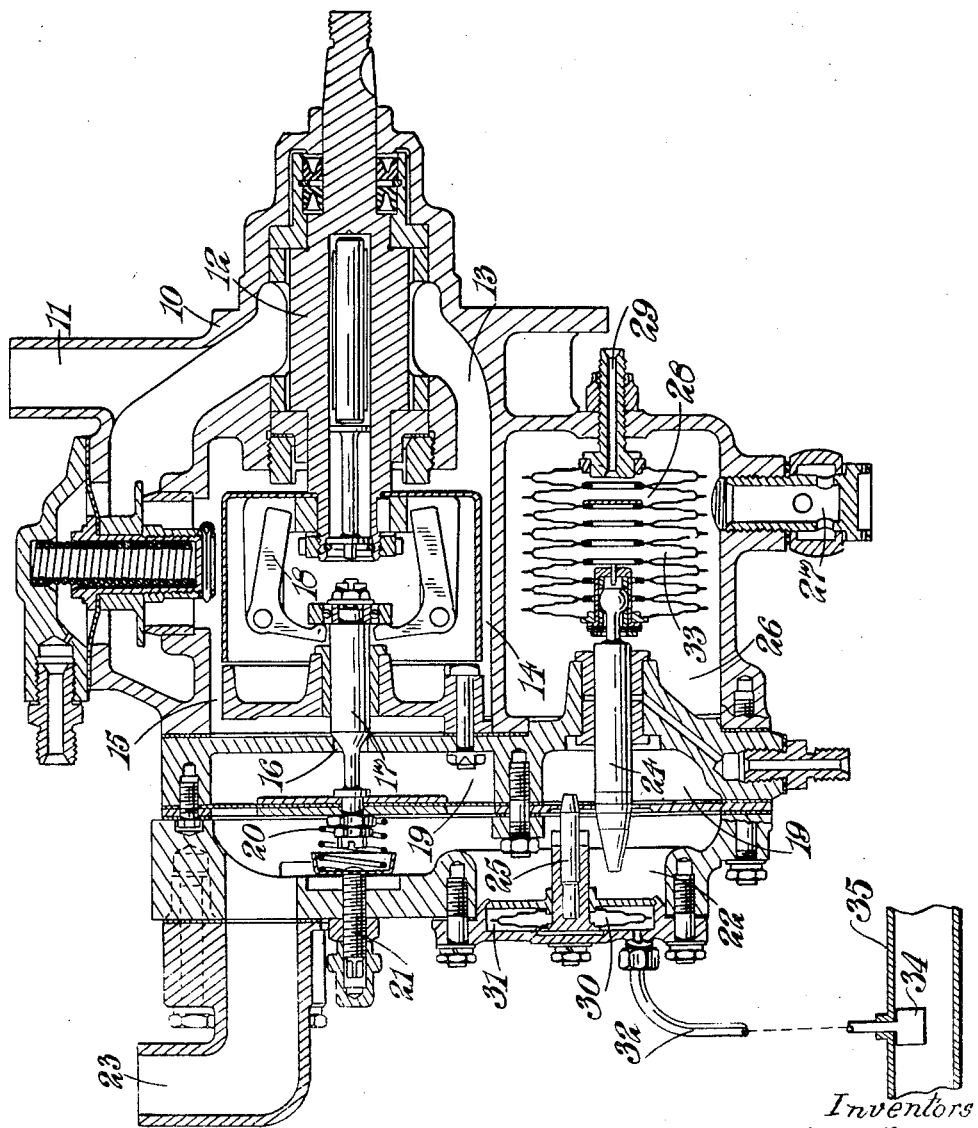

2,529,900

UNITED STATES PATENT OFFICE 2,529,900

FUEL FLOW CONTROL FOR INTERNAL-COMBUSTION ENGINES

Paul Whibley Bedale, Littleover, Derby, and John Oliver Philip Hughes, Duffield, England, assignors to Rolls-Royce Limited, Derby, England, a British company Application October 29, 1946, Serial No. 706,314
In Great Britain October 3, 1945

Section 1, Public Law 690, August 8, 1946
Patent expires October 3, 1965

1 Claim. (Cl. 123—139)

This invention relates to fuel-injection pumps for internal-combustion engines and has for its object to provide an improved construction whereby the rate of flow of fuel can be accurately controlled in accordance with the requirements in a more simple manner than has hitherto been used.

When an internal-combustion engine is required to operate under widely varying conditions of ambient pressure, temperature and loading, as in the case of an aircraft engine, the rate of fuel supply which is suitable is given by the formula:

$$F = KN \frac{(P_c - \tfrac{1}{6}P_e)}{T_c}$$

where F is the rate of fuel supply, N is the engine speed, $P_c$ is the boost pressure, $P_e$ is the back pressure, $T_c$ is the absolute temperature in the induction pipe and K is a constant. From this formula it will be seen that the flow is proportional to the boost and back pressure factor and inversely proportional to the absolute temperature. Although this is the ideal result required, the mechanism used to achieve it automatically is somewhat complicated and bulky and since moving linkages are required, any wear in the linkage may give inaccurate results.

It can be shown that a sufficiently close approximation to the above stated fuel-flow formula over a small but practicable range of temperatures is given by the equation:

$$F = N[k_1(P_c - \tfrac{1}{6}P_e) + k_2(T_0 - T_c)]$$

where $k_1$ and $k_2$ are constants and $T_0$ is a temperature pre-selected to have a value which is the mean temperature of the operating range.

The object of this invention is to provide a construction which will operate in accordance with the second formula given above.

One embodiment of this invention which will now be described by way of example is illustrated in the accompanying drawing which is a central sectional view of the complete fuel pump and controlling valves.

Referring to this drawing the apparatus comprises a casing 10 having a fuel-inlet-pipe 11 which delivers the fuel to a pump 12; this pump is illustrated as a vane-pump, but any suitable type of pump may be used. The pump delivers the fuel by the passage 13 to a chamber 14 from which it passes by a passage 15 to an outlet port 16. This port is controlled by a needle valve 17 operated by a governor 18 which is driven at engine-speed or at a speed proportional thereto so as to open or close the valve in accordance with variations of the engine-speed, and thereby admit the fuel to a chamber 19 at a pressure which is dependent upon the speed of the engine. In some circumstances a further control or controls may be operative on the valve 17 to meet certain conditions, such for example, as adjustment for slow-running, such being indicated by the spring 20 controlled by an adjustable abutment 21.

From the chamber 19 the fuel passes to another chamber 22 and thence by the outlet 23 to the induction pipe of the engine.

The communication between the chamber 19 and the chamber 22 is effected by means of two ports controlled respectively by the needle valves 24 and 25. These two ports are in parallel with one another. The needle valve 24 is directly connected to a stack of evacuated capsules 33 situated in a chamber 26 which is in communication with the induction pipe of the engine so as to be subjected to the boost-pressure existing therein, such communication being made by the connection 27. The stack of capsules also includes one or more capsules 28 which are open to atmosphere at 29 so as to be responsive to any variations in atmospheric pressure, i. e., the back-pressure on the engine.

The needle valve 25 controlling the second outlet port from the chamber 20, which is a particular feature of this invention, is controlled so as to open or close the port in accordance with the temperature existing in the induction pipe. It is directly operated by a flexible capsule 30 mounted in a chamber 31 which is connected by the pipe 32 to a thermometric bulb 34 of any convenient or well known type situated in the induction pipe 35, so that temperature changes in the induction pipe produce a change of pressure in the chamber 31 to which the capsule 30 is responsive. Obviously however any other thermometric device capable of operating the valve 25 in the desired manner may be used. The arrangement is such that the valve controls the area of its orifice proportionally to the factor $T_0 - T_c$ in the second equation mentioned above. With this arrangement, at temperature $T_0$ the temperature-controlled jet is partially open and variations in the induction pipe temperature from the mean temperature $T_0$ thereof results in an increase or decrease of the fuel-flow past the valve 25 and therefore of the total fuel-flow through the two jets. The temperature-controlled jet and the needle valve 25 are so proportioned that the minimum aperture therethrough occurs at a temperature higher than is normally met with in practice.

It will be seen therefore that the rate of flow of fuel determined by the two valves 24, 25 controlling jet orifices in parallel with one another fulfils the conditions called for in the second equation and that this effect is obtained by a very simple construction and arrangement of valves directly connected to their operating capsules so that linkages and complicated mechanism are entirely dispensed with.

Minor departures of the rate of fuel-flow from that specified by the second equation such as are required, for example, for enrichment of the mixture under maximum-power conditions, are obtained in the usual manner by appropriate contouring of the needle valve 24 which is operated by the pressure-sensitive capsules.

We claim:

A fuel-injection device for a supercharged internal combustion engine comprising in combination a fuel-pump; a discharge conduit from said fuel-pump; a first throttle valve in said conduit; a second throttle valve in said conduit in series with and downstream of said first throttle valve; a third throttle valve in said conduit in series with said first throttle valve and in parallel with said second throttle valve; a speed-responsive loading device loading said first throttle valve to open with a load proportional to the square of engine speed N; a pressure-responsive loading device loading said first throttle valve to close with a load proportional to the pressure drop across said second and third throttle valves, whereby in operation said first throttle valve is adjusted to maintain said pressure drop directly proportional to the square of engine speed; pressure responsive means responsive to boost pressure $p_c$ and to ambient atmospheric pressure $p_e$; an operative connection between said pressure responsive means and said second throttle valve, whereby said second throttle valve is adjusted solely by said pressure responsive means to have an area which varies according to the function $$\left(p_c - \frac{1}{n}p_e\right)$$

where $n$ is a constant approximately equal to the compression ratio of the engine; temperature responsive means responsive to induction temperature $t_c$; an operative connection between said temperature responsive means and said third throttle valve; whereby said third throttle valve is adjusted solely by said temperature responsive device to have an area which varies according to the function $(t_0 - t_c)$, $t_0$ being a mean value of induction temperature; the combination being operative to control the fuel flow F through said conduit in accordance with the equation $$F = N\left[k_1\left(p_c - \frac{1}{n}p_e\right) + k_2(t_0 - t_c)\right]$$

where $k_1$ and $k_2$ are constants.

PAUL WHIBLEY BEDALE.
JOHN OLIVER PHILIP HUGHES.

REFERENCES CITED

The following references are of record in the file of this patent:

FOREIGN PATENTS

| Number | Country | Date |
|---|---|---|
| 560,196 | Great Britain | Mar. 24, 1944 |